UNITED STATES PATENT OFFICE.

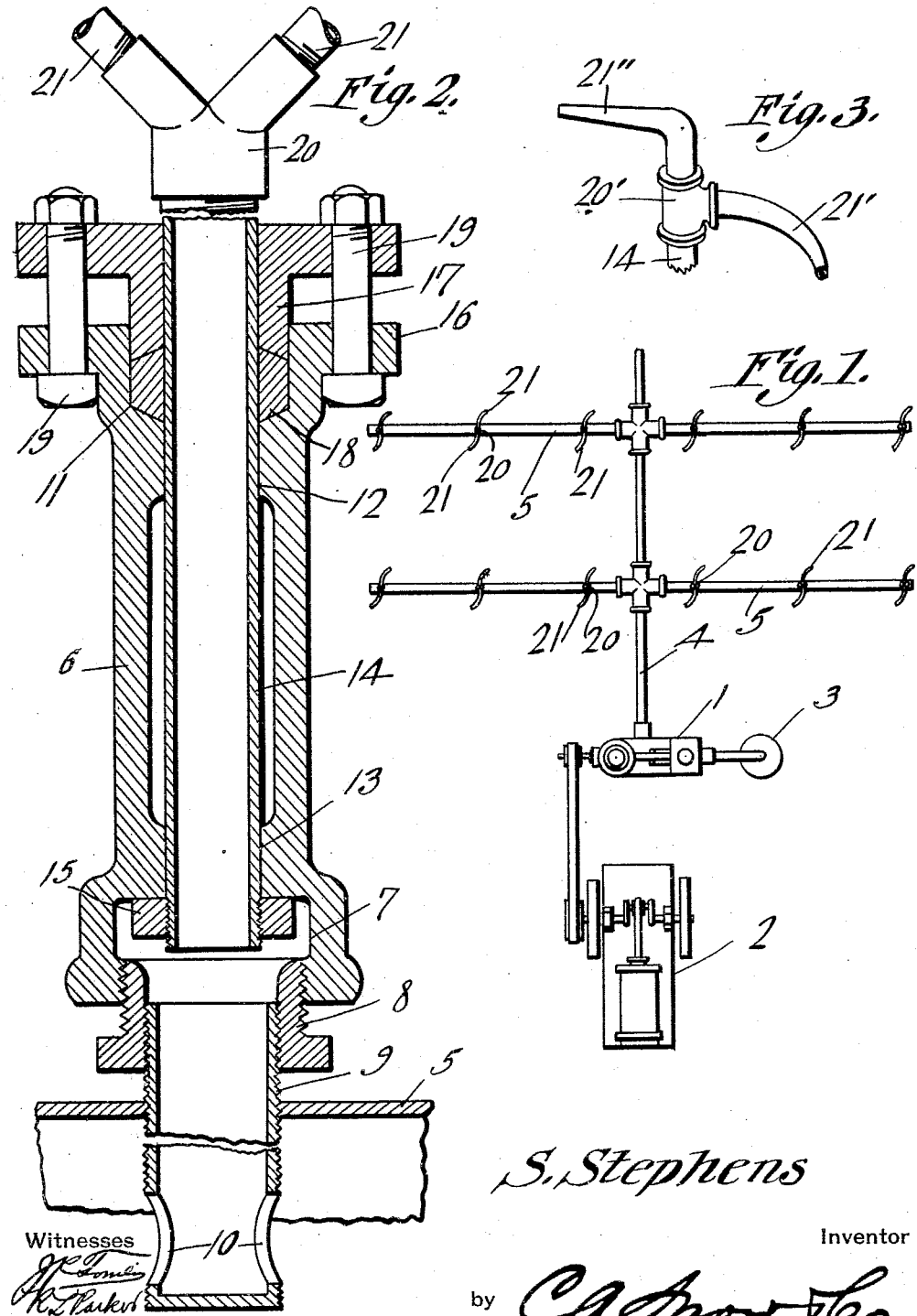

STERLING STEPHENS, OF BUSHNELL, FLORIDA.

IRRIGATING APPARATUS.

1,309,225.  Specification of Letters Patent.  Patented July 8, 1919.

Application filed December 21, 1916, Serial No. 138,240. Renewed May 27, 1919. Serial No. 300,181.

*To all whom it may concern:*

Be it known that I, STERLING STEPHENS, a citizen of the United States, residing at Bushnell, in the county of Sumter and State of Florida, have invented a new and useful Irrigating Apparatus, of which the following is a specification.

The present invention appertains to irrigating apparatus, and aims to provide a novel and improved invention for watering vegetation or growing crops, especially in arid localities, the apparatus including rotatable water outlet nozzles at various points of the field and rotatable by the reaction as the water is discharged therefrom, to spray or distribute the water.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a plan view of the apparatus.

Fig. 2 is an enlarged vertical section of one of the spray devices, portions being broken away and others being shown in elevation.

Fig. 3 is a perspective view of a modified pair of water outlet nozzles.

The apparatus includes a pump 1 operated by a suitable engine 2 for pumping water from a well or reservoir 3 into a main pipe 4 extending longitudinally across the field, and from which lateral branches 5 extend. The pipes 4 and 5 can be laid upon the ground or can be buried.

Spray devices are applied to the branch pipes 5 and are located at suitably arranged points in order that the entire area within the outline of the piping can be watered when the pump 1 is operated. Each of the spray devices embodies an upright tubular body 6 provided with a counter bore 7 at its lower end threadedly receiving a bushing 8 which is in turn threaded upon the upper end of a tubular member 9 threaded downwardly through the top of the respective branch pipe 5. The tubular member 9 depends within the branch pipe and has its lower end closed, being provided adjacent to its lower end with openings 10 in its side walls for receiving the water, which flows upwardly through the member 9.

The tubular body 6 of the spray device is provided at its upper end with a counter bore or stuffing box 11, and the body 6 has contracted portions 12 and 13 adjacent to the stuffing box 11 and recess or counter bore 7, respectively, through which a vertical rotatable pipe 14 is journaled. A nut or collar 15 is threaded upon the lower terminal of the pipe 14 and seats upwardly within the counter bore 7 to limit the upward movement of the pipe 14, the nut 15 being held within the counter bore 7 by the bushing 8 whether or not the bushing is applied to the tubular member 9.

The body 6 has an outstanding flange 16 at its upper end, and a gland 17 fitted upon the pipe 14 enters the stuffing box 11 to compress the packing 18 thereagainst the pipe 14 to prevent leakage, the gland 17 being forced toward the stuffing box by means of bolts 19 connecting the gland with the flange 16.

A Y-coupling 20 is threaded onto the upper end of the pipe 14, and nozzles 21 are attached to the arms or branches of the coupling 20 for spraying the water, the nozzles being curved in order that the reaction resulting from the discharge of the water will rotate the nozzles with the pipe 14, thereby distributing the water over a circular area. The water being delivered under pressure into the lateral or branch pipes 5 will flow up through the tubular members 9 and pipes 14 to and out of the nozzles.

In the modification illustrated in Fig. 3, a vertical T-coupling 20' has its lower end attached to the upper end of the rotatable pipe 14, and a nozzle 21' is connected to the laterally or horizontally projecting arm or branch of the coupling 20' and is curved toward one side horizontally in order that the reaction due to the flow of water from the nozzle 21' will rotate the pipe 14 and nozzles. A second nozzle 21'' is attached to the upper end of the coupling 20' and is curved toward one side radially in order to deliver the water at a point farther from the pipe 14, thereby increasing the area watered by this construction.

Having thus described the invention, what is claimed as new is:

A device of the character described, embodying a supply pipe, an upright tubular body having a counter bore at its lower end, a stuffing box at its upper end, and contracted portions adjacent to said counter bore and stuffing box, a vertical pipe journaled through said contracted portions, a collar engaged upon the lower end of the pipe within the counter bore, a bushing engaged within the counter bore, a gland fitted upon said pipe and entering the stuffing box, and a water discharge nozzle carried by the upper end of said pipe, and a tubular member having its upper end engaged within the bushing, said tubular member being engaged down through the top of the supply pipe and having its lower end closed and an opening at one side near its lower end.

In testimony that I claim the foregoing as my own, I have hereto affixed my signature in the presence of two witnesses.

STERLING STEPHENS.

Witnesses:
 MAY WILCOX,
 M. G. POTTER.